United States Patent

[11] 3,564,301

| [72] | Inventors | John D. McGhee<br>Plymouth Meeting, Pa.;<br>Raymond W. Tabeling, Wilmington, Del. |
|---|---|---|
| [21] | Appl. No. | 704,443 |
| [22] | Filed | Feb. 9, 1968 |
| [45] | Patented | Feb. 16, 1971 |
| [73] | Assignee | E. I. Du Pont de Nemours & Co.<br>Wilmington, Del. |

[54] DARK CURRENT COMPENSATING CIRCUIT
14 Claims, 1 Drawing Fig.

[52] U.S. Cl. ................................................. 307/311;
328/2, 328/127, 328/151; 307/229
[51] Int. Cl. ................................................. H03k 3/42
[50] Field of Search ................................................. 328/151,
127, 128, 2; 250/207; 307/311

[56] References Cited
UNITED STATES PATENTS
| 3,158,759 | 11/1964 | Jasper | 307/229 |
| 3,304,506 | 2/1967 | Weekes | 328/151 |
| 3,398,373 | 8/1968 | Caswell | 328/127 |
| 3,419,806 | 12/1968 | Gordy | 328/2 |
| 3,439,172 | 4/1969 | Chapman | 250/207 |

*Primary Examiner*—Donald D. Forrer
*Assistant Examiner*—Harold A. Dixson
*Attorney*—Herbert M. Wolfson ABSTRACT: The disclosure relates to an electrical circuit and method for suppressing the effect of undesirable electrical signal, such as, the dark current of a photomultiplier tube. The circuit comprises, preferably, a current-to-volts amplifier with a feedback that includes a noninverting amplifier and a memory. The method for suppressing the effect of dark current consists of biasing the memory under no light conditions until the output potential of the current-to-volts amplifier is zeroed to the input level and holding the bias while monitoring the output of the current-to-volts amplifier under light conditions.

PATENTED FEB 16 1971
3,564,301
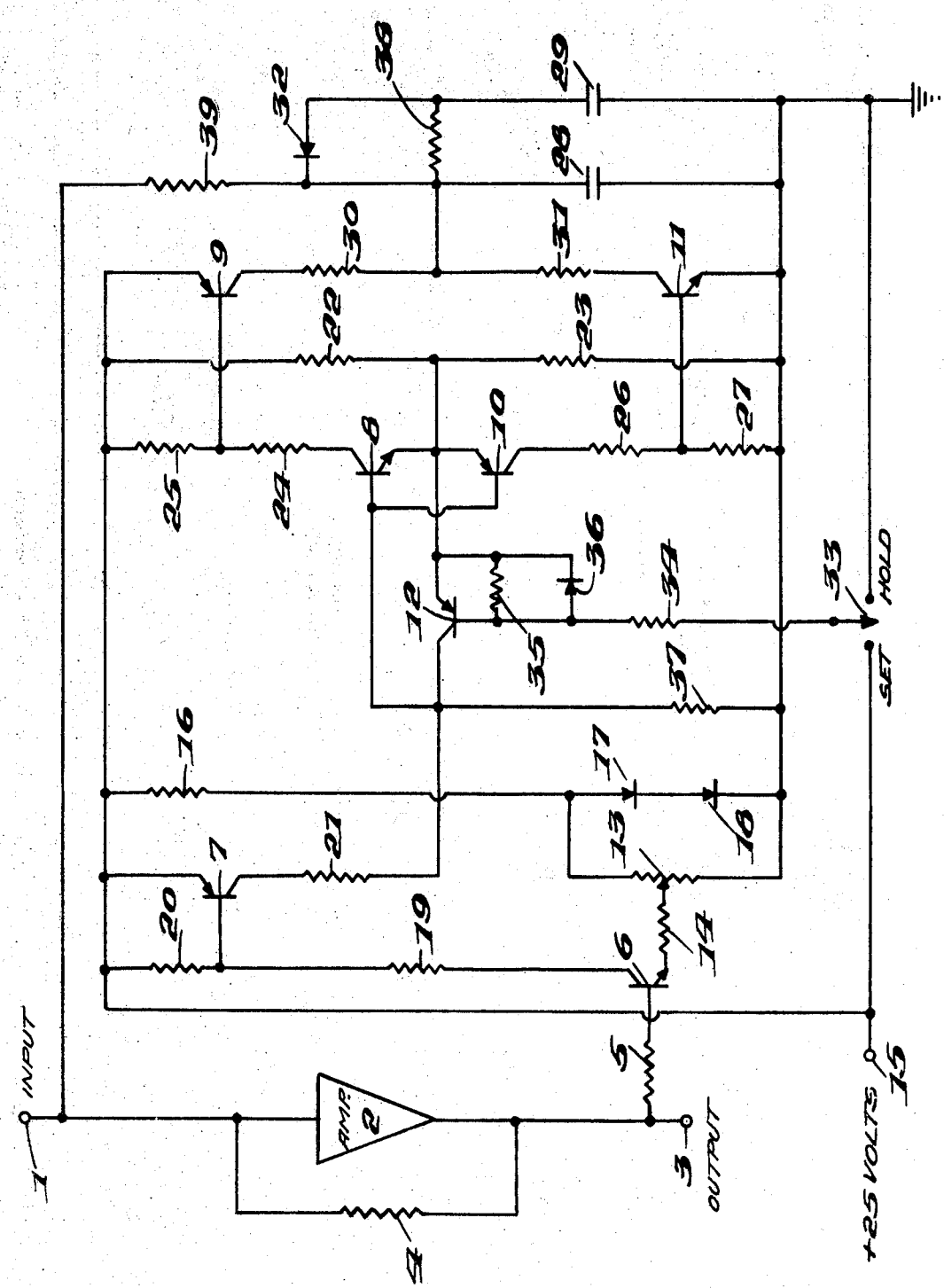
INVENTORS
JOHN D. McGHEE,
RAYMOND W. TREBELING,
BY
AGENT

DARK CURRENT COMPENSATING CIRCUIT

CROSS-REFERENCE TO A RELATED APPLICATION

This invention is particularly related to the subject matter of application Ser. No. 704,445, filed on the same day, entitled Energy Sensing Device by the same inventors, in that the instant invention may be used in the system described and claimed therein to suppress the effect of undesirable signals. This cross reference is merely illustrative and not intended to restrict the scope and/or use of either invention.

Even though a photomultiplier tube is in complete darkness, electron currents may be observed to flow from dynode to dynode. These currents increase toward the anode end of the tube in the same manner as photo-originated currents. The current in the anode circuit of the tube is known as the dark current of the photomultiplier tube. This dark current and the resulting noise of the tube is of particular concern because it is usually the critical factor in limiting the lower level of light detection. The dark current generally consists of random unidirectional pulses created primarily by thermionic emission.

One method for reducing the effect of dark current employs various cryostats to take advantage of the reduced noise at low temperatures. However, it is necessary to maintain the photomultiplier tube at a fixed temperature and to take measures to prevent condensation of moisture on the window of the tube. In addition, this method does not completely eliminate dark current.

Another approach utilizes a pair of photomultiplier tubes in combination with an anticoincidence circuit. This is based on the idealized assumption that the random pulses of dark current in a pair of photomultiplier tubes do not occur at the same time. Thus, coincident dark current pulses are not suppressed.

By the practice of the present invention, the effect of an undesirable signal, such as the dark current of a photomultiplier tube, may be reduced or eliminated. This invention relates to an electrical circuit for suppressing the effect of the time average of an undesirable signal together with a method for the same. The circuit comprises a first circuit means, having input and output terminals, adapted to provide a conductive path for said signal, and a feedback connected between said input and output terminals, said feedback including a capacitive means adapted to be biased in relation to the signal at said output terminal such that the magnitude of the time average of the signal at said output terminal is reduced or eliminated.

For a better understanding of the invention reference is made to the following detailed description and the attendant drawing which illustrates a preferred embodiment of the invention.

As readily apparent to one skilled in the art, the present invention can be employed to suppress the effect of the time average of any undesirable positive or negative electrical signal regardless of the cause or source of the signal. For exemplary purposes, the subsequent description will be limited to dark current compensation or suppression wherein the dark current has been filtered to a relatively constant direct current.

In the accompanying drawing the dark current from a photomultiplier tube is fed to input terminal 1 of a current-to-volts amplifier that includes operational amplifier 2, output terminal 3 and resistor 4, which is connected across operational amplifier 2. Input terminal 1 is held at a fixed positive potential by the current-to-volts amplifier through feedback resistor 4.

The voltage at output terminal 3 is amplified by a noninverting amplifier, connected through resistor 5 to output terminal 3, that includes transistors 6, 7, 8, 9, 10, 11 and 12. The emitter of transistor 6 is biased by variable voltage divider 13 through resistor 14. Divider 13 is grounded at one end and coupled to a positive potential such as plus 25-volt supply 15 via resistor 16. The voltage drop across divider 13 is limited by serially connected diodes 17 and 18, coupled in parallel across divider 13. The output of transistor 6 is fed through resistor 19 to transistor 7. The amplification of transistor 7 is controlled by the voltage drop across resistor 20, positioned between the +25-volt emitter and the base. The amplified output passes through resistor 21 to the bases of transistors 8 and 10. The emitters of transistors 8 and 10 are held at about 12.5 volts by the divider action of resistors 22 and 23 which are coupled between ground and plus 25-volt supply 15. When the potential of the bases of transistors 8 and 10 is greater than 12.5 volts, only transistor 8 conducts. When less, only transistor 10 conducts. The collector of transistor 8 is connected through resistor 24 to transistor 9 and through resistors 24 and 25 to plus 25-volt supply 15. Transistor 10 is similarly connected through resistors 26 to transistor 11 and through resistors 26 and 27 to ground. The emitters of transistors 9 and 11 are held at 25 volts and ground, respectively.

When transistor 9 conducts in response to the signal from transistor 8, capacitors 28 and 29 are charged via resistor 30. When transistor 11 conducts, capacitors 28 and 29 are discharged via resistor 31. The relative values of resistors 30 and 31 are dependent upon the magnitude of the desired bias on capacitors 28 and 29 and the supply voltages. In this embodiment, resistor 30 is about 10 times resistor 31. This reduces the output shifting due to noise at one-eleventh the +25-volt supply. In the preferred embodiment shown, the circuit incorporates a short term memory, capacitor 28, that has a fast response to variations in the signal from the non inverting amplifier and a long term memory, capacitor 29 in combination with resistor 38, that predominates over the short term memory. (Capacitor 29 has a larger capacitance than capacitor 28.) The averaged bias on capacitors 28 and 29 is then fed back to input terminal 1 through resistor 39. The resistance of resistor 31 should be relatively large in order to hold the capacitor charge. Diode 32, is connected between resistor 39 and capacitor 29 to discharge capacitor 29 if the charge on it becomes too high. (Diode 32 is nonconductive during normal random noise.)

Control transistor 12 is connected between the emitters and bases of transistors 8 and 10 to turn off transistors 8 and 10. The base of control transistor 12 is connected to manual switch 33 through resistor 34. When switch 33 is in contact with the +25-volt terminal, transistor 12 is turned off, allowing transistors 8 and 10 to alternately conduct in response to fluctuations in the dark current. When switch 33 is grounded, transistor 12 conducts, turning off both transistor 8 and transistor 10. Resistor 35 is connected across the emitter and base of transistor 12, to guarantee turn on. Diode 36, also connected between the same emitter and base, is incorporated to prevent breakdown of the emitter-base junction of transistor 12 under high reverse voltages. Resistor 37, connected between the collector of transistor 12 and ground, provides a suitable collector bias.

In operation, the dark current flows through the current-to-volts amplifier from terminal 1 to terminal 3. Initially the potential at terminal 3 is higher than at terminal 1. The signal at terminal 3 is amplified by transistors 6 and 7 and supplied to the bases of transistors 8 and 10. In response to the fluctuations of the dark current, transistors 8 and 10 are adapted to allow charging and discharging of capacitors 28 and 29 by holding switch 33 at the +25-volt set position. If the amplified signal is above about 12.5 volts, transistor 8 conducts, turning on transistor 9 thereby charging capacitors 28 and 29. If the signal is below this value, transistor 10 conducts, turning on transistor 11, thereby discharging the capacitors. The averaged signal from the capacitors feeds back through resistor 39 to terminal 1. By proper adjustment of voltage divider 13, the current flowing between the capacitors and terminal 1 will equal the average of the dark current. Thus, no current flows through resistor 4 of the current-to-volts amplifier and the potential at terminal 3 equals the potential of terminal 1.

When the dark current flowing through current-to-volts amplifier has been suppressed, switch 33 is switched to the grounded hold position and transistor 12 conducts. This turns off transistors 8 and 10, stopping the charging and discharging of capacitors 28 and 29. Since capacitor 29 is much larger than capacitor 28, capacitor 28 will be charged via resistor 38 to the value of capacitor 29. Large value resistor 39 holds the average of the dark current after transistors 8 and 10 are turned off.

The photomultiplier tube is then exposed to light. The current flowing through resistor 4 to terminal 3 is now equal to the total output of the photomultiplier tube minus the average dark current component. Thus the signal at terminal 3 is proportional to the light impinging upon the photomultiplier tube.

As previously pointed out, the present invention is not restricted to suppressing the effect of dark current from a photomultiplier tube, but may be employed to eliminate or reduce any undesired electrical signal. It will be understood that various changes in the details, materials, steps, and arrangement of parts, which have been herein described and illustrated, may be made by those skilled in the art within the principle and scope of the invention as expressed in the appended claims.

We claim:

1. A circuit for suppressing the effect of a given electrical signal which is relatively constant over a determined time period comprising:
   a. a first circuit means having an output terminal, a fixed potential input terminal, and a conductive path for said electrical signal from said input terminal to said output terminal;
   b. an amplifying means, the input of which is coupled to said output terminal of said circuit means;
   c. a capacitive means coupled to the output of said amplifying means, said amplifying means being adapted to bias said capacitive means during a first portion of said time period;
   d. an isolating means disposed between said output terminal and said capacitive means and isolating said capacitive means from said output terminal during a second portion of said time period; and
   e. a second circuit means coupled between said capacitive means and said input terminal of said first circuit means and providing a flow path between said capacitive means and said input terminal at least during said second portion of said time period, whereby the magnitude of the electrical signal at said output terminal resulting from said given electrical signal is reduced at least during said second portion of said time period.

2. The circuit of claim 1 wherein:
   a. said input of said amplifying means is connected to said output terminal; and
   b. said isolating mean is connected between and provides a conductive path between said output of said amplifying means and said capacitive mean during said first portion of said time period and isolates said capacitive means from said output of said amplifying means during said second portion of said time period.

3. The circuit of claim 2 wherein said first circuit means is an operational amplifier having a resistive feedback.

4. The circuit of claim 2 wherein said second circuit means is adapted to provide a flow path between said input terminal and said capacitive means during said first and second portions of said time period and said amplifying means is adjustable such that the potential at said output terminal can be set substantially equal to the potential at said input terminal during said first portion of said time period.

5. The circuit of claim 2 wherein said amplifying means is adapted to charge and discharge said capacitive mean during said first portion of said time period in response to fluctuations in said given electrical signal such that the bias charge on said capacitive means is determined by the average value of said given electrical signal.

6. The circuit of claim 5 wherein said capacitive means comprises a short term memory and a long term memory, said short term memory adapted to respond rapidly to said fluctuations and said long term memory adapted to predominate thereby controlling the bias on said capacitive means.

7. A circuit for suppressing the effect of the average value of a given electrical signal, the average being relatively constant over a determined time period, said given electrical signal being present alone during a first portion of said time period and in combination with at least one other electrical signal during a second portion of said time period, said circuit comprising: an operational amplifier having an output terminal and a fixed potential input terminal, resistance feedback connected between said output and input terminals, an adjustable amplifying means connected to said output terminal, a capacitive means coupled to said amplifying means, said amplifying means adapted to charge and discharge said capacitive means during only said first portion of said time period in response to fluctuations in said given electrical signal such that the bias charge on said capacitive means is determined by the average value of said given electrical signal, and resistive means coupled between said capacitive means and said input terminal of said operational amplifier, said resistive means selected such that by adjustment of said adjustable amplifying means, an electrical signal substantially equal to the average of said given electrical signal will flow between said input terminal and said capacitive means during said time period.

8. The circuit of claim 7 wherein said amplifying means includes a pair of transistors connected together through their base terminals and through one other terminal of such that said pair of transistors are alternately driven conductive and nonconductive during said first portion of said time period in response to fluctuations in said given electrical signal, and a control transistor having the conductive path formed by its collector and emitter terminals coupled between said base terminals and said other terminals of said pair of transistors, said control transistor being adapted to turn off said pair of transistors during said second portion of said time period.

9. The circuit of claim 7 wherein said capacitive means comprises a short term memory and a long term memory, said short term memory adapted to respond rapidly to said fluctuations and said long term memory adapted to predominate thereby controlling the bias on said capacitive means.

10. The circuit of claim 9 wherein said short term memory is a low value capacitor and said long term memory is high value capacitor in combination with a resistor.

11. A method for suppressing the effect of the dark current of a photomultiplier tube comprising:
   a. passing said dark current through a current-to-volts amplifier;
   b. biasing with the output of said amplifier and under no-light conditions at least one capacitor coupled to the input and output of said amplifier;
   c. supplying the current flow from said capacitor to said amplifier input, said biasing being continued until said current flow from said capacitor to said input is sufficient to zero the output potential of said amplifier to its input level under said no-light conditions; and
   d. maintaining said current flow from said capacitor to said amplifier input while the current from said photomultiplier tube resulting from a reading taken under light conditions is passed through said current-to-volts amplifier whereby the effect of said dark current is suppressed from the results of said reading taken under light conditions at said output of said amplifier.

12. A method for suppressing the effect of the average value of a first electrical signal on a second electrical signal, the average of said first signal being relatively constant during a determined time period comprising:
   a. passing said first electrical signal through a current-to-volts amplifier;
   b. biasing with the output of said amplifier at least one capacitor coupled to the input and output of said amplifier during a first portion of said time period;

c. supplying the current flow from said capacitor to said amplifier output, said biasing being continued until said current flow from said capacitor to said input is sufficient to zero the output potential of said amplifier to its input level; and d. maintaining said current flow from said capacitor to said amplifier input during a second portion of said time period while said second signal is passed through said current-to-volts amplifier whereby the effect of said first signal is suppressed from said second signal at said output of said amplifier.

13. A circuit for suppressing the effect of the average value of a given electrical signal, the average being relatively constant over a determined time period, said given electrical signal being present alone during a first portion of said time period and in combination with at least one other electrical signal during a second portion of said time period, said circuit comprising:

a. an operational amplifier having an output terminal and a fixed potential input terminal;

b. a resistance feedback connected between said output and input terminals;

c. an adjustable amplifying means, the input of which is coupled to said output terminal;

d. a capacitive means coupled to the output of said adjustable amplifying means;

e. an isolating means disposed between said output terminal and said capacitive means, during said first portion of said time period and isolating said capacitive means from said output terminal during said second portion of said time period, said amplifying means adapted to bias said capacitive means during said first portion of said time period; and f. a resistive means coupled between said capacitive means and said input terminal of said operational amplifier, said resistive means selected such that by adjustment of said adjustable amplifying means an electrical signal substantially equal to the average of said given electrical signal will flow between said input terminal and said capacitive means during said time period.

14. The circuit of claim 13 wherein:

a. said input of said amplifying means is connected to said output terminal; and amplifying b. said isolating means is connected between and provides a conductive path between said output of said adjustable amplifying means and said capacitive means, during said first portion of said time period and isolating said capacitive means from said adjustable amplifying means during said second portion of said time period, said amplifying means adapted to bias said capacitive means during only said first portion of said time period.

PO-1050
(5/69)

UNITED STATES PATENT OFFICE
CERTIFICATE OF CORRECTION

Patent No. 3,564,301     Dated February 16, 1971

Inventor(s) John D. McGhee  and  Raymond W. Tabeling

It is certified that error appears in the above-identified patent and that said Letters Patent are hereby corrected as shown below:

Column 5, line 2, delete "output" and insert --input--.

Column 6, line 17, after "and" delete "amplifying".

Signed and sealed this 1st day of June 1971.

(SEAL)
Attest:

EDWARD M. FLETCHER, JR.            WILLIAM E. SCHUHLER,
Attesting Officer                  Commissioner of Pate